sausage-type meat product being processed to make certain that such product is in fact preserved, means are provided by this invention for automatically discontinuing the operation of the sausage forming and processing machine when the quantity of preservative supplied for mixture with the meat product falls to a predetermined minimum.

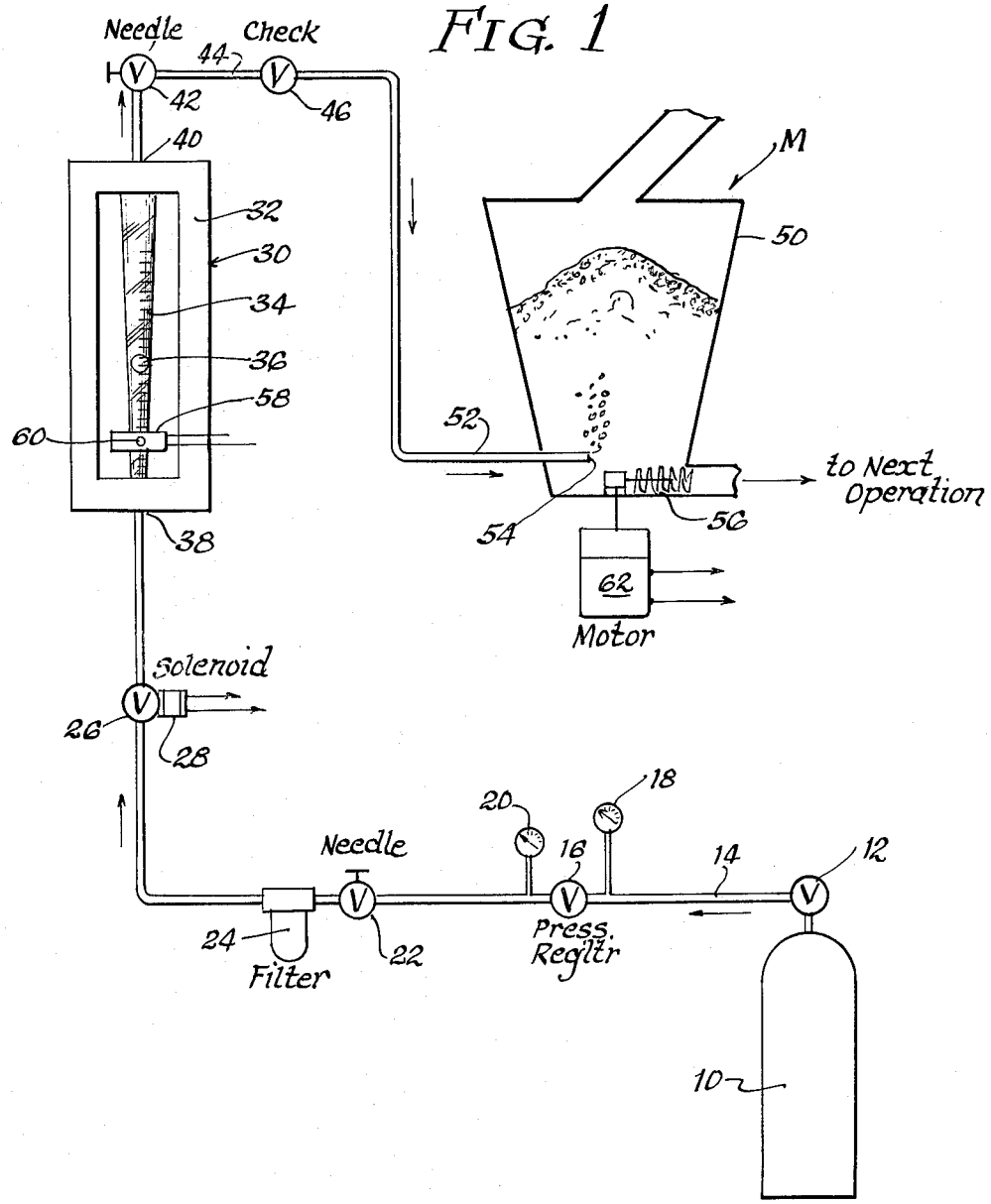

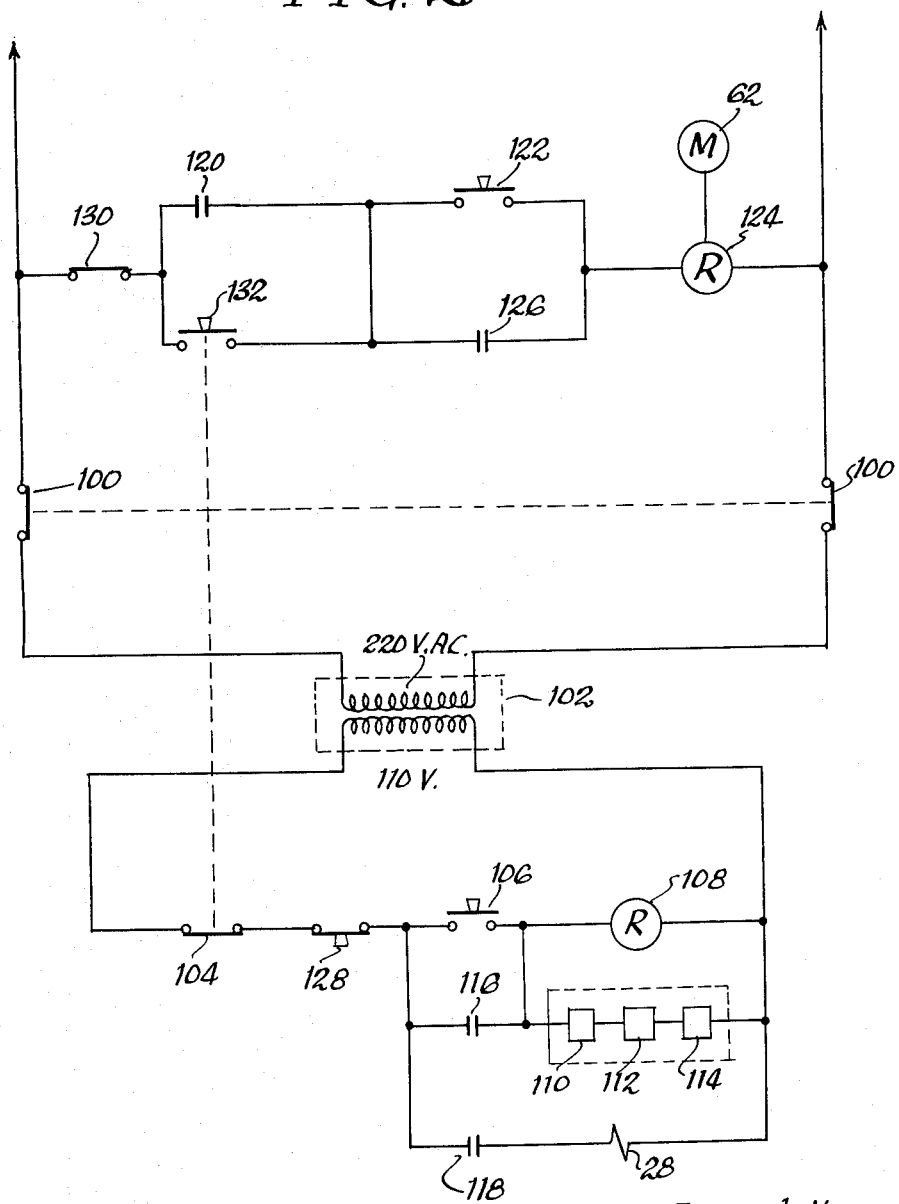

United States Patent Office 3,259,054
Patented July 5, 1966

3,259,054
CURING MEANS
Emanuel Vanzo, Jr., Oradell, and Barbato A. Roccanova, Paramus, N.J., and Hugo H. van der Heide, Nyack, N.Y., assignors to The Matheson Company, Inc., East Rutherford, N.J., a corporation of New Jersey
Filed Apr. 29, 1964, Ser. No. 363,465
6 Claims. (Cl. 99—254)

At one point or another in the manufacture of sausage-type meat products, such as frankfurters, it is necessary to introduce one or more preservatives or curatives to assure good color, proper shelf life and wholesomeness.

It has been determined just recently that nitrate and nitrite preservatives conventionally used for such purposes may be eliminated and fluid preservatives such as gaseous nitric oxide substituted therefor. That discovery appears to have provided the basis for United States Patent No. 2,930,703 entitled "Meat Curing" which issued March 29, 1960 to Robert H. Harper. While fluid preservatives such as gaseous nitric oxide have a number of advantages which the solid nitrates, nitrites and other conventionally used solid preservatives do not, their fluid state presents handling problems from several points of view. Those include both the manner of introduction of the preservative into a typically semi-solid meat emulsion (the raw-meat product which most of the sausage-type meat products are made today) and that of making absolutely certain that at least a predetermined minimum amount of preservative is mixed with and added to the raw-meat product. Of course it was necessary to resolve those problems in the context of the highly automated facilities of today which turn out sausage-type meat products at very high rates of speed and which handle thousands of pounds of meat emulsion hourly.

It is to means for continuously introducing at least a predetermined uniform quantity of fluid preservative into and for mixture with a raw-meat product such as a meat emulsion and for automatically discontinuing the processing of the raw-meat product when the rate of flow of the preservative drops to a predetermined minimum that this invention is directed.

Accordingly it is a principal object of this invention to provide means for automatically discontinuing the processing of a raw-meat product when the predetermined necessary quantity of a fluid preservative is not available to provide a properly preserved meat product.

A further object of this invention is to provide means in a sausage-type meat product processing machine for introducing gaseous preservative into a mixing station thereof for mixture with a raw-meat product, and from which mixing station a preserved meat product is discharged, together with means for automatically stopping the discharge of meat product when an insufficient quantity of gaseous preservative is available to preserve said raw-meat product.

Further objects and advantages of this invention will become apparent from the following description and drawings of which:

FIGURE 1 is a schematic representation of the mechanical elements forming a preferred embodiment of this invention; and FIG. 2 is a circuit diagram of a preferred embodiment of this invention.

Referring first to FIGURE 1, cylinder 10 serves as a suitable fluid preservative source. The preferred fluid preservative is gaseous nitric oxide. Cylinder 10 includes a cylinder valve 12 adapted to open and close the cylinder. A conduit 14 downstream of the cylinder valve 12 is provided with a suitable regulator 16 having a delivery gauge 18 and a capacity gauge 20. Fine adjustment of the downstream pressure is provided by a needle valve 22. A line filter 24 assures the cleanest possible gaseous preservative.

A solenoid valve 26 operable by a solenoid 28 in a manner to be described is provided downstream of the preservative supply. The preferred flowmeter of this invention is a rotameter 30. Rotameter 30 includes a housing 32, a calibrated metering tube 34, and a metering rotor, or float 36. Rotameter 30 has an inlet end 38 and a discharge end 40. A suitable valve such as needle valve 42 is provided, such as at discharge end 40, to permit fine control for the flow rate of the preservative through the metering tube. To prevent backflow in conduit 44 a check valve 46 is provided.

The preservative is intended, of course, of be introduced into a meat product requiring a preservative. In the preferred embodiment here described the fluid preservative is introduced at the mixing station M of a sausage forming and processing machine, at which station raw-meat product and preservative are mixed and from which station a preserved meat product is discharged. The details of the forming and processing machine beyond the mixing station M are not critical to this invention, hence are not described in detail.

Mixing station M comprises a generally conical mixing trough 50. Into the top of trough 50 a preservable meat product emulsion or other raw-meat product is introduced either manually or mechanically. The consistency and type of raw-meat product and the manner of its introduction depend upon the preserved end product desired and other factors basically unimportant to an understanding of this invention. It is to be understood, however, that certain of those variables will bear upon the amount of gaseous preservative required and used, hence upon the predetermined minimum amount of gaseous preservative introduced into the mixing zone of mixing station M.

In operation the raw-meat product fills the trough 50 to a level above the point at which the gaseous preservative is introduced. As seen in FIGURE 1 a conduit 52 having an open end 54 extends into the mixing trough adjacent its bottom. Preferably, for the most effective ultimate mixing of preservative and meat product, the open end 54 of conduit 52 should reach into the mixing trough 50 about one-third of the distance between the sloping walls of mixing trough 50 at the elevation of conduit 52.

As mentioned, depending upon a number of variables, including the type of raw-meat product, its consistency, the capacity of the sausage forming and processing machine, the capacity of mixing station M and the factor of safety required, a predetermined minimum quantity of gaseous preservative must be provided at the mixing station. At least that predetermined amount of preservative, in the case of gaseous nitric oxide which is heavier than air, together with the raw-meat product, is then thoroughly mixed by suitable mixing means 56. The fact that the gaseous preservative is heavier than air reduces its loss from the mixing trough and enhances its ability to mix with the raw-meat product. Mixing means 56 may comprise a screw mixer, which also serves as a means for conveying or discharging the preserved meat product from the base of mixing trough 50 to the next station in the sausage forming machine. Alternatively, the mixing means may be any other type conventionally used as long as it provides for adequate mixing of the preservative and the meat product to yield a properly preserved meat product and the discharging means may be any separate discharging means conventionally used.

Since it is essential that a predetermined minimum amount of preservative be available for mixture with the raw-meat product in a sausage making machine, it is necessary to provide means which will sense the failure of the system to provide a sufficient amount of preservative and to automatically prevent the discharge of insufficiently preserved raw-meat product from mixing station M. Such means are an integral and assential part of this invention, and a preferred embodiment thereof and its manner of operation will now be described.

Referring to FIGURE 1, calibrated metering tube 34 is seen to be circumscribed by a sensing coil 58 potted with a resin, such as an epoxy resin, to insure stability and immunity to ambient conditions. Sensing coil 58 is adjustable and movable along the entire length of metering tube 34. It is fixably, but slidably connected to metering tube 34 by one or more set screws 60, preferably of a plastic material. Depending upon the required rate of flow of the preservative, sensing coil 58 is fixed at one elevation or another along metering tube 34. The point at which it is fixed will serve to define the minimum predetermined rate of flow at which the mixing station M of the sausage forming and processing machine will be deactivated and the mixing and discharging means stopped.

It will be understood that in normal operation the metallic rotor or float 36, which may be of stainless steel, will be suspended by the gaseous preservative in the metering tube 34 at a level above the point at which sensing coil 58 is secured to the metering tube 34. Except during start-up, it is only in the unusual case, such as when the supply of gaseous preservative is substantially exhausted or some malfunction occurs, that the rate of flow through the rotameter 30 will decrease to a rate at which float 36 drops to the elevation of sensing coil 58, resulting in a deactivation of the motor 62 for the mixing and discharging means 56 and in stopping of the gaseous preservative flow.

Prior to start-up of the preservative supply system, float 36 is at rest below sensing coil 58. The sensing coil 58 is located at an elevation along metering tube 34 which by previous calibration has been determined to be at a level in the metering tube 34 which indicates the minimum flow rate desired for the particular type of raw-meat product to be preserved. In setting the sensing coil 58 and the predetermined flow rate, the capacity of the mixing station M, the type of meat product, the factor of safety (the precentage excess of preservative to be supplied) and other similar factors must be considered and evaluated. Once the sensing coil 58 is positioned, the system is ready to be actuated.

Referring now to FIG. 2 it is seen that power is provided for a 110 volt alternating current control circuit by moving control circuit power switch 100 to an "On" position. The 110 volt power source is provided by a 220 volt alternating current power supply and transformer 102. Finally, selector switch 104, when set in a "Run" position, readies the control circuit for functioning.

The control circuit is energized by a reset 106 which is closed by suitable switch means, such as a push button. The reset must be manually maintained for a few seconds. This permits load relay 108 to be energized. At the same time power is provided through the same path to an oscillator unit 110, of which sensing coil 58 is a part. Oscillator unit 110 creates a signal which is amplified by an amplifier 112, thereby providing a signal for a control relay 114. Control relay 114 then closes maintaining contact 116, which maintains power to load relay 108 and oscillator unit 110.

Load relay 108, having been energized, normally open contact 118 thereon closes, energizing solenoid 28 and opening solenoid valve 26. Once open, solenoid valve 26 permits gaseous preservative to flow through inlet opening 38 of rotameter 30. If the rate of flow of the gas is sufficient, float 36 will begin to rise in metering tube 34. It will be apparent that the reset 106 must be held in its closed position until float 36 rises above the level of sensing coil 58 for if reset 106 is released before float 36 has risen above sensing coil 58, when it enters the field of coil 58, power will be lost to load relay 108 and the control circuit will revert to its pre-start-up position. Upon entering the field of sensing coil 58 float 36 eliminates the characteristic oscillation of the oscillator unit 110 thereby eliminating the signal to the amplifier 112 and the source of power for control relay 114, hence opening maintaining contact 116.

Assuming the reset 106 is maintained in its closed position, as float 36 enters the field of sensing coil 58 the output of amplifier 112 is temporarily eliminated. However, the load relay 108 continues to be energized, thereby maintaining contact 118 closed, which provides power to solenoid 28. As such, preservative continues to flow, thereby elevating float 36 above the field of sensing coil 58. Once the float 36 is above the field, the oscillator unit 110 will once again provide the desired characteristic signal for amplifier 112 and control relay 114 will close maintaining contact 116, which remains closed until the source of power to control relay 114 is disturbed. Once float 36 reaches a position above the field of sensing coil 58, the reset 106 may be released. Then, unless the control circuit 110 volt power source is disturbed, the only circumstance under which the maintaining contact 116 will open is if the float 36 drops into the field of sensing coil 58 by reason of an interruption in the flow of gaseous preservative through the flowmeter 30.

All that remains for the system to operate is the starting of the motor 62 for mixing means 56. As heretofore indicated, the load relay 108 is energized at the moment the reset 106 is activated, thereby also closing normally open interlocking contact 120. 200 volt power is then available for the 220 volt alternating current motor control circuit. Depression of the start button 122 will energize motor control relay 124 and motor 62. Since normally open contact 126 located on motor control relay 124 closes when relay 124 is energized, contact 126 then provides a path for maintenance of power to the relay 124 when the start button 122 is released. The interlocking relay contact 120 insures the fact that the motor 62 may not be started in normal operation until the solenoid valve 26 has been opened.

Before start button 122 is depressed, the operator should determine that the rate of flow of the preservative is at the desired level, that is that the float 36 is above the level of sensing coil 58. As such, he should wait until the lines are purged and the gaseous preservative reaches the mixing trough 50, usually a period of only a few seconds. Alternatively, since gas flow is nearly instantaneous upon actuating reset 106 and since the start-up of the motor 62 requires some time, reset 106 and start button 122 may be located so that they may be actuated simultaneously by depressing a single button.

The system may at any time be stopped by opening normally closed stop switch 128 which cuts off power to the load relay 108 and the amplifier unit 112. Interlocking contact 120 located on the load relay 108 will then open, which eliminates control power for motor 62 thereby stopping it. So also will contact 118 open, de-energizing solenoid 28. The solenoid valve 26 is thereby closed and the flow of gaseous preservative is halted.

By the foregoing means both the gas supply and the motor 62 are automatically shut off when the rate of flow of gaseous preservative decreases to the predetermined minimum rate of flow. This prevents the wastage of gaseous preservative and most importantly prevents the processing of meat product which has been provided with an insufficient amount of preservative. While the motor 62 may be started without gas flowing, such as for purposes of cleanout, normally it will not run without the presence of gas unless both the start switch 122 and reset 106 are manually held in the closed position.

For purposes of cleanout, purging and the like, switches may be provided to facilitate operation of the motor 62 without the gas supply and vice versa. Thus, to purge or operate the gas system without a corresponding actuation of the motor 62, a normally closed switch 130 provided in the motor control circuit can be opened. In no event can the motor 62 be energized under such circumstances.

Similarly, to operate only the motor 62, selector switch 104 can be moved from its normal control circuit closing or "Run" position described earlier, to a manual position in which the control circuit is opened and contacts 132 in the motor control circuit are closed.

The foregoing detailed description and drawings of a presently preferred embodiment of our invention will make it obvious to those ordinarily skilled in the art that various modifications may be made therein without departing from the spirit and scope of our invention.

We claim:
1. In combination with a machine for making a sausage-type meat product having a mixing station into which raw-meat product is introduced and from which preserved meat product is discharged, a source of fluid preservative, conduit means interconnecting said source of fluid preservative and said mixing station for introducing fluid preservative into said mixing station to preserve said raw-meat product, a flow meter downstream of said source of fluid preservative and upstream of said mixing station for measuring the rate of flow of said fluid preservative, adjustable means operatively connected to said flow meter for sensing a predetermined minimum rate of flow of said fluid preservative, and means responsive to said adjustable means for discontinuing the discharge of meat product from said mixing station when the rate of flow of said fluid preservative drops below said predetermined minimum rate of flow.

2. The device of claim 1 in which said means responsive to said adjustable means also stops the flow of fluid preservative through said conduit means.

3. In a machine for making a sausage-type meat product, a trough shaped mixing station into which raw-meat product and a gaseous preservative are introduced and from which preserved meat product is discharged, a source of gaseous preservative, a conduit interconnecting said source and said trough shaped mixing station and extending into a mixing zone in said mixing station, means for mixing said raw-meat product and said gaseous preservative and for discharging preserved meat product from said mixing station, means for actuating and stopping said mixing and discharging means, a flow meter intermediate said gaseous preservative source and said mixing station for measuring the rate of flow of said gaseous preservative, adjustable means operatively connected to said flow meter for sensing a predetermined minimum rate of flow of said gaseous preservative, and means responsive to said adjustable means for stopping said mixing and discharging means when the rate of flow drops below said predetermined minimum and for discontinuing the flow of gaseous preservative through said conduit.

4. The machine of claim 3 in which said flow meter is a vertically disposed rotameter having a float movable in a rotameter tube in response to variations in the rate of flow of said gaseous preservative through said rotameter and in which said sensing means comprise a coil circumscribing said rotameter tube and movable vertically along said rotameter tube to vary said predetermined minimum rate of flow.

5. The machine of claim 3 in which said conduit extending into the mixing zone of said mixing station extends thereinto about one-third of the distance between the walls of said trough shaped mixing station.

6. In a sausage-type meat product making machine having a mixing station into which raw-meat product and gaseous preservative are introduced and from which preserved meat product is discharged, said mixing station having mixing and discharging means therein, a regulatable source of gaseous preservative, conduit means for conducting gaseous preservative to a rotameter, conduit means for conducting gaseous preservative from said rotameter to said mixing station, said last-named conduit means extending into a mixing zone in said mixing station, valve means in one of said conduit means for adjusting the rate of gaseous preservative through said rotameter, a sensing coil operatively and adjustably connected to said rotameter for sensing a predetermined minimum rate of flow of said gaseous preservative through said rotameter, means for detecting a change in output of said sensing coil and responsive to said change for automatically stopping said mixing and discharging means in said mixing station to prevent the discharge from said mixing station of improperly preserved meat product and for automatically stopping the flow of gaseous preservative through said rotameter, and means for initiating the flow of gaseous preservative through said conduit means and said rotameter and into said mixing station prior to rendering operable the mixing and discharging means of said mixing station.

References Cited by the Examiner
UNITED STATES PATENTS

| | | | |
|---|---|---|---|
| 1,720,264 | 7/1929 | Robillard | 261—124 |
| 2,503,091 | 4/1950 | Brooke et al. | 73—209 X |
| 2,550,942 | 5/1951 | Spangler | 99—256 X |
| 2,631,099 | 3/1953 | Bonotto | 99—235 X |
| 2,907,662 | 10/1959 | Covey | 99—109 X |
| 2,930,703 | 3/1960 | Harper | 99—159 |
| 3,149,753 | 9/1964 | Forsythe | 222—63 |

WALTER A. SCHEEL, *Primary Examiner.*

CLYDE I. COUGHENOUR, *Assistant Examiner.*